Figure 1:
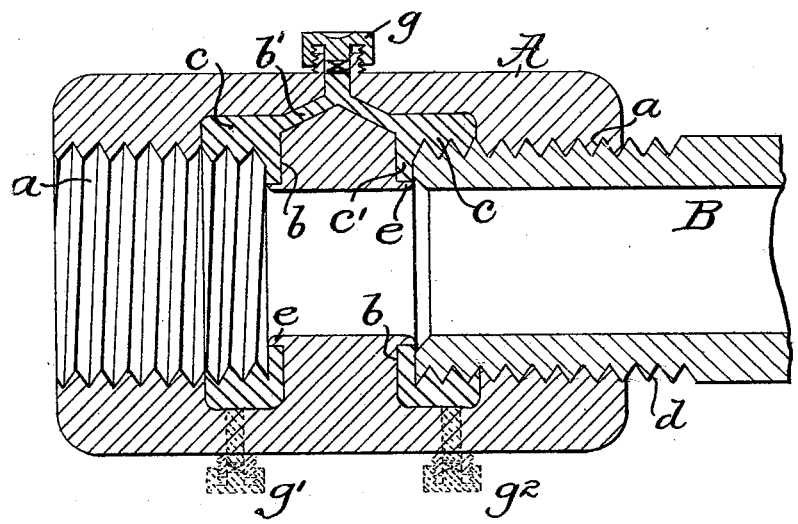

(No Model.)

W. W. GAGE.
PIPE COUPLING.

No. 521,465.  Patented June 19, 1894.

WITNESSES:
Daniel E. Delavan
W. H. Graham

INVENTOR
Wellesley W. Gage,
BY
Graham
ATTORNEY

UNITED STATES PATENT OFFICE.

WELLESLEY W. GAGE, OF NEW YORK, N. Y.

PIPE-COUPLING.

SPECIFICATION forming part of Letters Patent No. 521,465, dated June 19, 1894.

Application filed October 12, 1892. Serial No. 448,637. (No model.)

*To all whom it may concern:*

Be it known that I, WELLESLEY W. GAGE, a citizen of the United States of America, residing in the city, county, and State of New York, have invented certain new and useful Improvements in Pipe-Couplings, of which the following is a specification.

This invention relates generally to couplings or joints of pipes and the like, and more particularly to the manner of packing or sealing the joint between the pipe and the coupling.

Hitherto many different methods of packing the joint between the coupling and the pipe have been proposed with a view of rendering such joints effective against leakage in withstanding high pressure fluids, as well as providing convenient means for tightening the joint should any leakage occur.

The present improvements are directed to these ends, and consist in a soft metal seal or packing arranged in a recess beyond the end of the threaded portion of the coupling so that the end of the pipe, in being screwed "home" will finally screw into the soft metal seal and become so firmly connected thereto as to prevent any leakage beyond or past said seal. The seal and recess are so arranged that the seal also forms a soft metal abutment for the end of the pipe to become embedded in, or to fit firmly against, thereby preventing the pressure fluid in the pipe from acting upon the end of the pipe to dislodge it and cause leakage. The wall of the recess containing the soft metal seal is also so formed as to provide an overhanging lip which confines the seal to the recess as it is being compressed by the pipe. The soft metal employed as the seal is preferably lead, which owing to its capacity while cold to flow when under pressure forms a ready method of stopping a leak by applying pressure to some portion of the soft metal seal to cause it to pack with greater firmness against the end and threads of the pipe. For this purpose there is provided a plug arranged to press firmly against the soft metal at a point removed from the joint, and in order to make this pressure automatic or capable of taking up and stopping any leak automatically, there is combined with the plug and soft metal a spring washer that bears at all times upon the soft metal tending to make it flow to stop a leakage, immediately the liability occurs. Should the end of the pipe stop short of abutting against the seal, the pressure of the fluid in the pipe will cause the exposed portion of the seal to be pressed firmly around the pipe.

With this general statement of the nature and function of the improvement a detailed description thereof will now be given, reference being had to the accompanying drawings forming a part thereof, in which drawings—

Figure 2:
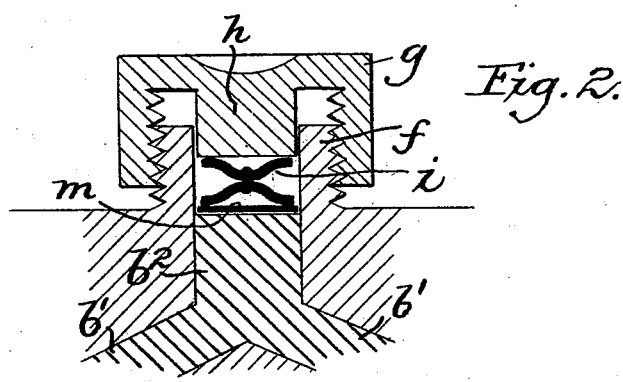
Figure 3:
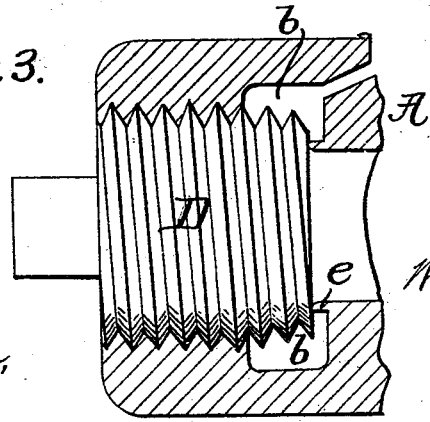

Figure 1, is a sectional elevation of a coupling provided with the invention with the end of a pipe in place in the right hand end of the coupling. Fig. 2, is an enlarged detail section of the adjusting plug and spring washer. Fig. 3, is a sectional elevation of the screw threaded former used to form the inclined surface to the soft metal seal.

In practice, the coupling A, which while shown of the ordinary straight form, might be of any of the forms that are employed in pipe joints, is threaded from either end with the female threads $a$, which extend a short distance inward toward the middle of the coupling. Immediately adjacent the inner end of the female threads $a$, there is formed a recess $b$, of sufficient depth and length to hold a suitable body of soft metal $c$, such as lead, to form the seal for the pipe joint. The inner wall of the recess, $b$, is preferably provided with an overlying lip $e$, projecting outward toward the end of the pipe which usually will stand nearly touching said lip, and which lip forms a continuous ledge around the inner end of the recess to prevent the soft metal seal from being forced out of the recess in the act of screwing the pipe "home."

Where the coupling is adapted to unite two lengths of pipe and is provided with two recesses filled with soft metal $c$, as shown in Fig. 1, the back of the recesses will have a communicating channel $b'$, in communication also with, it may be, a single passage $b^2$, leading to the outside of the coupling, which may serve as the opening through which the soft metal in a molten state is poured into the recesses, to become molded therein in the manner represented at the left of Fig. 1. The molded metal has an inside diameter fully equal to that of the inside pitch diameter of the threads $a$, and gradually decreases in diameter as it approaches the wall of the recess. A suitable threaded form D, with a slightly tapering end is introduced into the coupling A, to confine the metal to the recess or recesses and to shape and thread the exposed surface of the metal as shown. The passage $b^2$, terminates in an exteriorly threaded nipple $f$, adapted to receive an internally threaded screw cap $g$. This cap carries a central plug $h$, adapted to enter the passage $b^2$, to bear against the top surface of the soft metal in the passage, so that should any leakage past the joint be detected the cap $g$, may be screwed farther down and its plug $h$, caused to press forcibly on the body of soft metal $c$, causing it to "flow" and close up any imperfection in the seal of the joint.

As the leakage may occur at points throughout the piping not of ready access and not easily detected, I prefer to employ an automatic forcing means such as a spring $i$, interposed in the passage $b^2$, between the surface of the soft metal therein and an abutment such as the screw cap $g$. In the present instance there is shown a pair of spring disks, loose or riveted together centrally, the lower one bearing against a plain disk $m$, resting upon the soft metal. In practice, the screw cap $g$, is screwed down so as to firmly compress the spring $i$, so that the spring constantly exerts a pressure upon the entire body of the soft metal in the recess or recesses, from which it will appear that should any looseness in the joint between the pipe, coupling and seal occur by reason of the jar to which piping may be, or is, constantly subjected in factories and other places, the spring will be in position to continually act to compress the seal around the pipe joint the instant any jar, or other cause, may tend to loosen the joint and cause leakage.

It is not essential that a single passage $b^2$, spring $i$, and cap $g$, be used with the two soft metal seals shown, but each seal may be wholly disconnected and each have an independent passage, spring and cap, as indicated by dotted lines $g'$, $g^2$ Fig. 1.

The end of the pipe B, is provided with the usual exterior screw thread $d$, which on meeting the inclined threaded surface of the soft metal seal enters it and the pipe is gradually forced into the seal, the joint becoming tighter and tighter as the pipe approaches the end portion $c'$ of the seal.

In screwing the pipe B, into the coupling A, and the seal C, its inner end finally reaches the position shown in Fig. 1, where the extreme end of the pipe firmly abuts against a portion $c'$, of the soft metal that is held from displacement by the lip $e$. This provides a soft metal abutment for the end of the pipe to securely close the joint between it and the coupling at that point, and the remainder of the soft metal has become embedded in the threads around the pipe to further effectually close the joint. To permit the end of the pipe to escape the lip $e$, its end may be slightly counterbored, as in Fig. 1, to prevent the lip striking the pipe. The corners of the recesses $b$, are preferably curved as shown so that the soft metal will tend to "flow" as a whole more freely.

What is claimed is—

1. The herein described pipe coupling having a lead seal for the pipe joint and a spring bearing against the seal and against a fixed abutment.

2. The herein described pipe coupling having a lead seal for the pipe, a passage leading outward closed by a screw cap and a spring interposed between the lead and the cap forming an abutment.

3. The herein described pipe coupling having a recess, an end wall with an overlying lip, said recess being filled and the wall being lined with a soft metal for sealing the pipe,— the lip confining the soft metal to the end of the pipe while being compressed in forcing the pipe "home."

In witness whereof I have hereunto set my hand in the presence of two witnesses.

WELLESLEY W. GAGE.

Witnesses:
DANIEL E. DELAVAN,
GEO. H. GRAHAM.